June 3, 1947.  C. GERST  2,421,493
CLUTCH STRUCTURE
Filed Sept. 27, 1945   2 Sheets—Sheet 1
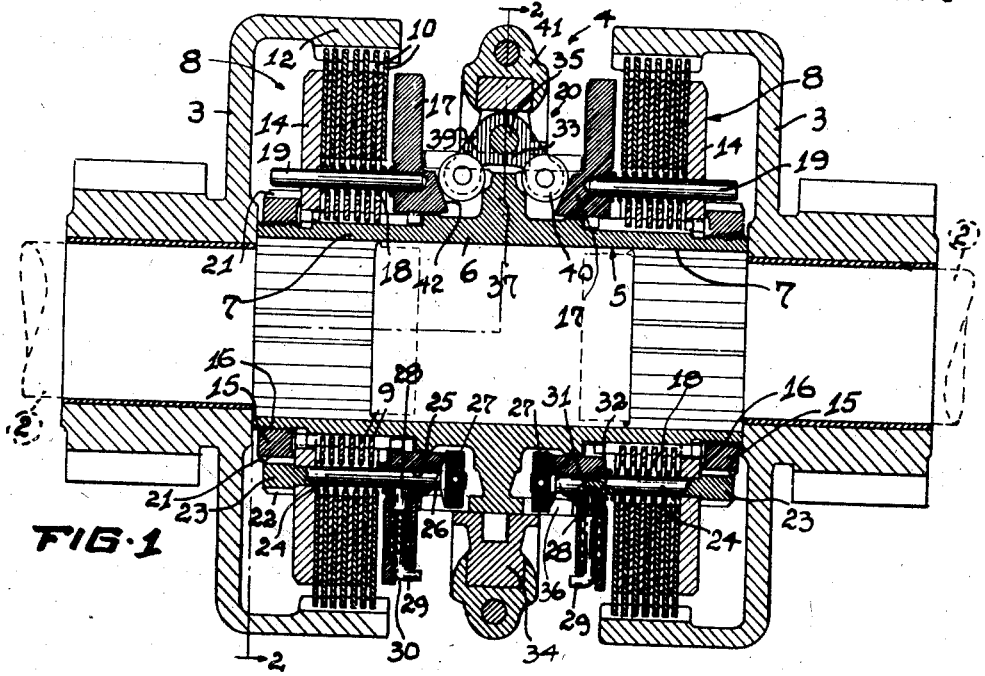
FIG·1
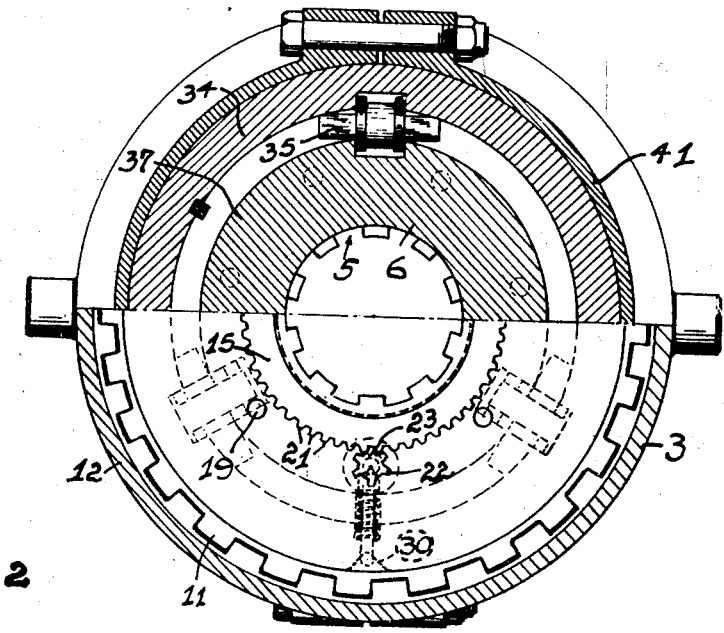
FIG·2
INVENTOR.
CHRIS GERST
BY
*Gustav A. Wolff* ATT.

June 3, 1947.　　　　　C. GERST　　　　　2,421,493
CLUTCH STRUCTURE
Filed Sept. 27, 1945　　　　　2 Sheets-Sheet 2
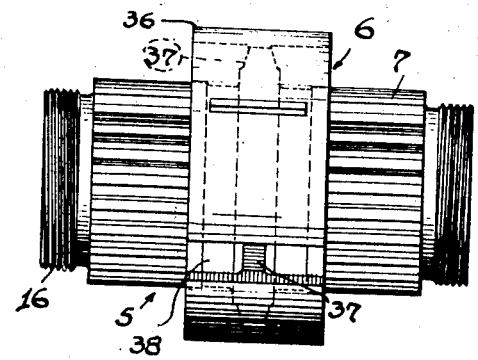
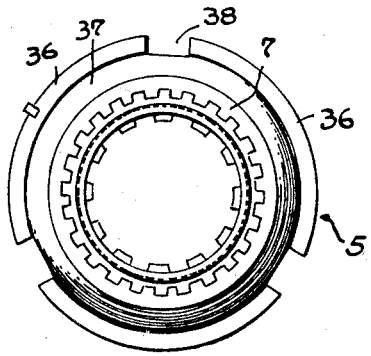
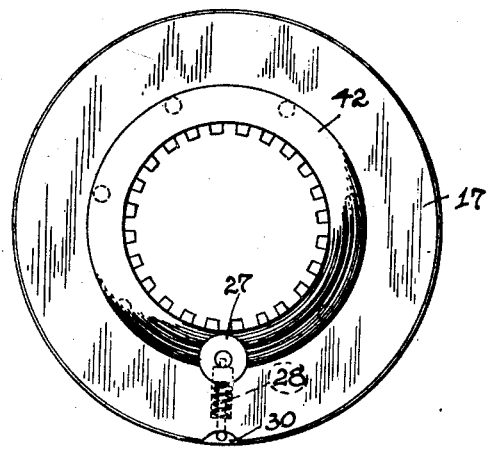
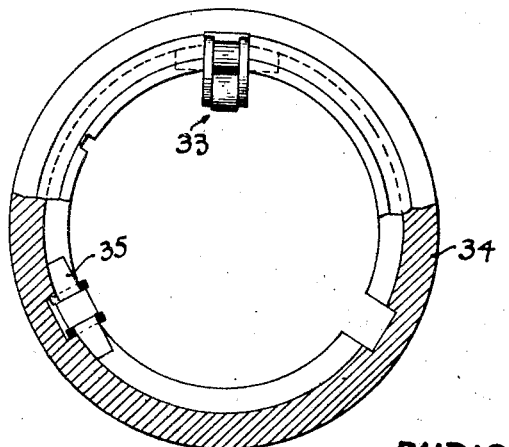
INVENTOR.
CHRIS GERST Patented June 3, 1947

2,421,493

UNITED STATES PATENT OFFICE 2,421,493

CLUTCH STRUCTURE

Chris Gerst, Detroit, Mich.

Application September 27, 1945, Serial No. 618,945

7 Claims. (Cl. 192—69)

This invention relates in general to friction clutches in which independently rotatable driving and driven members are coupled with each other by friction disks when same are frictionally engaged with each other by backing and clamping plates and, more particularly, to clutches with adjustable backing plates adapted to effect compensation for wear and tear on the friction disks of a clutch.

The general object of the present invention is the provision of a friction clutch having an adjustable backing plate and special mechanism adjacent to said plate adapted to adjust the position of the plate for compensating wear and tear on the friction elements of the clutch.

Another object of the invention is the provision of a friction clutch having a clamping plate, an adjustably mounted backing plate and mechanism adjacent to the backing plate adapted to adjust its position for compensating wear and tear of the friction elements of the clutch, such mechanism including actuating means extended through the clamping plate and the backing plate to facilitate actuation of such mechanism without disassembly of the clutch.

A further object of the invention is the provision of a friction clutch having a shiftable clamping plate, an adjustably mounted backing plate and mechanism for adjusting the position of the backing plate, such adjusting mechanism including actuating means extended through the clamping plate and locking means adapted to lock such actuating means in predetermined positions.

With the above and other incidental objects in view, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawings forming part of the specification.

In the drawings:

Fig. 1 is a longitudinal sectional view of a clutch constructed in accordance with the invention, the figure showing a dual arrangement of clutches adapted to be used for effecting changes in speed or a reversal in rotation of the driven member;

Fig. 2 is a cross sectional view of the clutch shown in Fig. 1, the section being taken on line 2—2 of Fig. 1;

Fig. 3 is a side elevation of the hub of the clutch structure shown in Figs. 1 and 2;

Fig. 4 is an end view of the hub shown in Fig. 3;

Fig. 5 is an end view of the clamping plate of the clutch; and

Fig. 6 is a side elevation, partly in section, of the shifting collar of the clutch.

Referring now more particularly to the clutch structure shown in the drawings, reference numerals 2 designate shafts, the driving members of the construction, and reference numerals 3 designate gears, the driven members of the construction. Shafts 2 are rigidly coupled with each other by a dual clutch construction 4, the elongated hub 5 of which is splined to said shafts. This hub includes a central portion 6 and reduced end portions 7 mounting identical clutch constructions 8, 8', only one of which will be described hereinafter. These constructions each embody a plurality of friction driving disks 9 splined to the end portions of hub 5 and arranged thereon for axial movement with respect thereto. These friction driving disks are alternately disposed with respect to a plurality of friction driven disks 10 with toothed peripheries 11 arranged in driving engagement with the toothed flange 12 of gear 3 so as to permit axial movement of disks 10 with respect to said flange. The thus related sets of friction driving disks 9 and friction driven disks 10 are forced into frictional driving engagement by a pair of clamping members, an adjustably mounted backing plate 14 splined to hub 5 and prevented from endwise movement by collar 15 threaded upon the threaded end 16 of hub 5, and a clamping or pressure plate 17 splined to hub 5 and axially shiftably arranged with respect thereto. These clamping members, backing plate 14 of which constitutes an adjustably mounted abutment, engage the assembly of disks 9 and 10 at its opposite sides and effect frictional driving engagement between these disks when the clamping or pressure plate 17 is shifted against the force of release springs 18 on guide pins 19 in plate 17 by a clutch actuating mechanism 20 hereinafter to be described.

Backing plate 14, which abuts against collar 15, is adjustably mounted to permit adjustment of the space between plates 14 and 17 and maintain proper relationship between these plates in accordance with wear and tear on friction disks 9 and 10. For such purpose, collar 15 is threadedly engaged with the threaded end 16 of hub 5 so that rotation of said collar effects axial shifting of backing plate 14 with respect to clamping plate 17. To facilitate such a rotation, the peripheral surface of collar 15 is formed with teeth 21 co-operating with the teeth 22 of a small gear 23 at the end of a shaft 24 which is extended through backing plate 14, friction driving disks 9 and a bore 25 in clamping plate 17 and carries at its exposed end 26, adjacent to clamping plate 17, knurled collar 27 permitting manual rotation of shaft 24 and therewith rotation of collar 15 for adjusting operations. A spring-pressed plunger 28 radially arranged in clamping plate 17 and provided at its outer end with an angular offset 29 adapted to ride on the peripheral surface of said clamping plate effects locking of shaft 24 when the angular offset 29 enters a recess 30 in said peripheral surface and permits interlocking of inner end 31 of plunger 28 with a recess 32 in shaft 24.

Clutch constructions 8, 8', are shifted into driving position by the clutch actuating mechanism 20 resembling the mechanism described in my co-pending application Ser. No. 537,874, filed May 29, 1944, now patent No. 2,392,984, dated January 15, 1946. This mechanism which is shiftably mounted on the central hub portion 6 embodies dual clutch lever means 33 pivotally coupled with a collar member 34 by means of a pin 35. The collar member is slidably keyed to a flange or rim 36 of hub 5 surrounding the enlarged central portion 6 of the hub and integrally connected therewith by a radial wall 37. Flange or rim 36 is cut away at 38 opposite dual clutch lever means 33 to permit tilting of lever arms 39 toward the axis of hub 5 and engagement of rollers 40 at the ends of these arms with the radial wall 37 when collar member 34 is shifted on flange or rim 36.

In clutching operations, when shifting collar 41 and therewith collar member 34 are shifted in either direction, rollers 40 on arms 39 tilt clutch lever means 33 toward the inclined contact surface 42 of clamping plate 17. In this movement the one roller 40 on the one lever arm 39 engages the inclined contact surface 42 of clamping plate 17, and, being backed against radial wall 37, shifts such clamping plate toward backing plate 14 and effects frictional driving engagement between disks 9 and 10. In clutch releasing operations collar 41 and therewith collar member 34 are shifted in the opposite direction permitting clamping plate 17 to be shifted in an opposite direction by release springs 18.

In clutch adjusting operations collar member 34 is shifted to release the clutch to be adjusted. Such shifting of collar member 34 freely exposes knurled collar 27 at the end of shaft 24 and permits its manual rotation for adjustment of the position of backing plate 14 as soon as spring-pressed plunger 28 has been withdrawn from recess 32 in shaft 24.

Having thus described my invention what I claim is:

1. In a clutch, the combination of friction members adapted for driving engagement with each other, a backing plate for said friction members, a clamping plate for said friction members, and means adapted to adjustably mount said backing plate, said means including rotatable actuating means extended through said backing and clamping plates.

2. In a clutch, the combination of friction members adapted for driving engagement with each other, a backing plate for said friction members, a clamping plate for said friction members, and means adapted to adjustably mount said backing plate, said means including rotatable actuating means extended through said backing and clamping plates, and locking means for said actuating means adapted to prevent rotation of said actuating means when in predetermined positions.

3. In a clutch, the combination of friction members adapted for driving engagement with each other, a backing plate for said friction members, a clamping plate for said friction members, and means adapted to adjustably mount said backing plate, said means including rotatable actuating means extended through said backing and clamping plates, and shiftable locking means for said actuating means supported by said clamping plate and adapted to prevent rotation of said actuating means when in predetermined positions.

4. In a clutch, the combination of friction members adapted for driving engagement with each other, a backing plate for said friction members, adjustable backing means for said backing plate, a clamping plate for said friction member, and means for adjusting said backing means extended through said backing and clamping means.

5. In a clutch a hub, clutching structures at opposite end portions of said hub, and clutch actuating means for selective actuation of either of said clutching structures mounted on the central portion of said hub, each of said clutching structures including friction members adapted for driving engagement with each other, a backing plate, a clamping plate, means adapted to adjustably mount said backing plate, and means to actuate said adjusting means, said clutching structures having their clamping plates near the central portion of said hub, and said actuating means for said adjusting means being extended through the respective clamping plates toward said central hub portion to facilitate adjustment of said backing plates.

6. In a clutch a hub, clutching structures at opposite end portions of said hub, and clutch actuating means for selective actuation of either of said clutching structures mounted on the central portion of said hub, each of said clutching structures including friction members adapted for driving engagement with each other, a backing plate, a clamping plate, a backing collar for said backing plate threadedly engaged with the hub for axial movement with respect thereto when rotated on said hub, and actuating means for said backing collar rotatably supported by said backing and clamping plate and coupled with said backing collar for rotating same.

7. In a clutch a hub, clutching structures at opposite end portions of said hub, and clutch actuating means for selective actuation of either of said clutching structures mounted on the central portion of said hub, each of said clutching structures including friction members adapted for driving engagement with each other, a backing plate, a clamping plate, a backing collar for said backing plate threadedly engaged with the hub for axial movement with respect thereto when rotated on said hub, actuating means for said backing collar rotatably supported by said backing and clamping plate and geared to said backing collar, and locking means for said actuating means.

CHRIS GERST.

REFERENCES CITED

The following references are of record in the file of this patent:

UNITED STATES PATENTS

| Number | Name | Date |
|---|---|---|
| 630,532 | Faucett | Aug. 8, 1899 |
| 739,255 | Bradley et al. | Sept. 15, 1903 |
| 943,695 | Grohmann | Feb. 8, 1910 |
| 1,016,427 | Morse | Feb. 6, 1912 |
| 2,243,035 | Hulkemeier | May 20, 1941 |
| 2,279,700 | Adamson | Apr. 14, 1942 |
| 2,392,984 | Gerst | Jan. 15, 1946 |